United States Patent

Bowers et al.

[11] Patent Number: 6,082,765
[45] Date of Patent: Jul. 4, 2000

[54] AIR BAG MODULE WITH FLUID VENTING

[75] Inventors: Paul A. Bowers, Ray; Wei W. Mu, Rochester Hills, both of Mich.

[73] Assignee: TRW Vehicle Safety Systems Inc., Lyndhurst, Ohio

[21] Appl. No.: 09/189,320

[22] Filed: Nov. 10, 1998

[51] Int. Cl.$^7$ .................................................. B60R 21/28
[52] U.S. Cl. ...................... 280/742; 280/728.2; 280/739
[58] Field of Search ................................. 280/739, 742, 280/728.2, 728.3, 738, 736, 740

[56] References Cited

U.S. PATENT DOCUMENTS

| 5,234,229 | 8/1993 | Gordon | 280/742 |
| 5,695,214 | 12/1997 | Faigle et al. | |
| 5,762,367 | 6/1998 | Wolanin | 280/742 |
| 5,799,974 | 9/1998 | Honda | 280/739 |
| 5,826,901 | 10/1998 | Adomeit | 280/728.2 |

*Primary Examiner*—Paul N. Dickson
*Attorney, Agent, or Firm*—Tarolli, Sundheim, Covell, Tummino & Szabo L.L.P.

[57] ABSTRACT

A vehicle safety apparatus (10) includes a vehicle occupant protection device (12) inflatable from a deflated condition to an inflated condition to help protect an occupant of a vehicle. An inflation fluid source (14) is actuatable to provide inflation fluid into the interior of the protection device (12) to inflate the protection device. The apparatus (10) includes at least one vent opening (40) in fluid communication with the interior of the protection device (12) for venting inflation fluid from the protection device. A deployment door (52) covers the protection device (12) and is movable from a closed condition to an open condition to enable inflation of the protection device. A member (70) movable with the deployment door (52) has a first position enabling venting of inflation fluid through the vent opening (40) and a second position closing the vent opening at least partially. The member (70) is in the first position when the deployment door (52) is in the closed condition to enable venting of inflation fluid through the vent opening (40). The member (70) moves from the first position to the second position thereby closing the vent opening (40) at least partially in response to movement of the deployment door (52) from the closed condition toward the open condition.

12 Claims, 6 Drawing Sheets

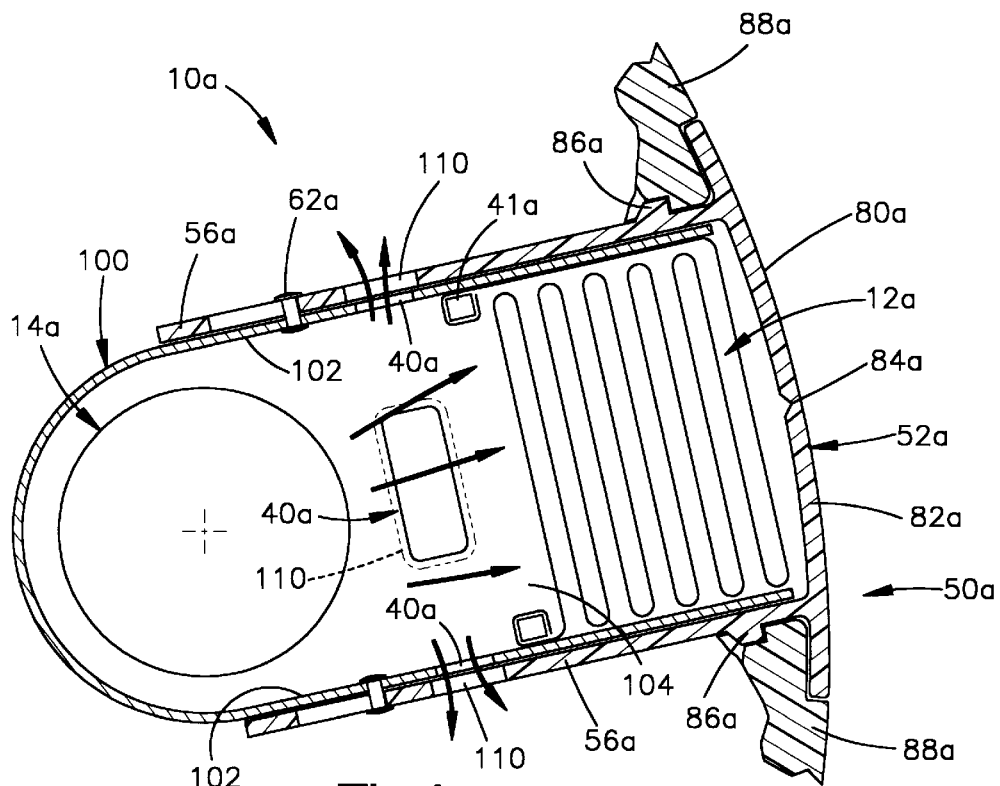
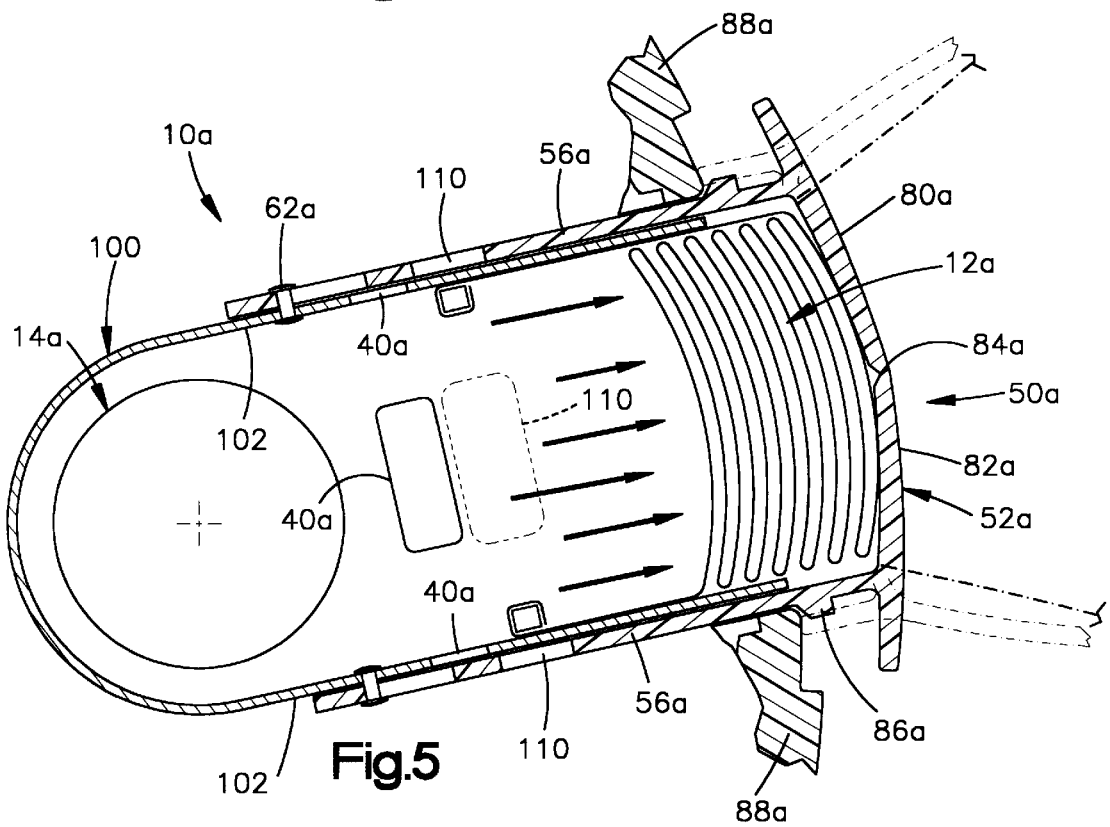

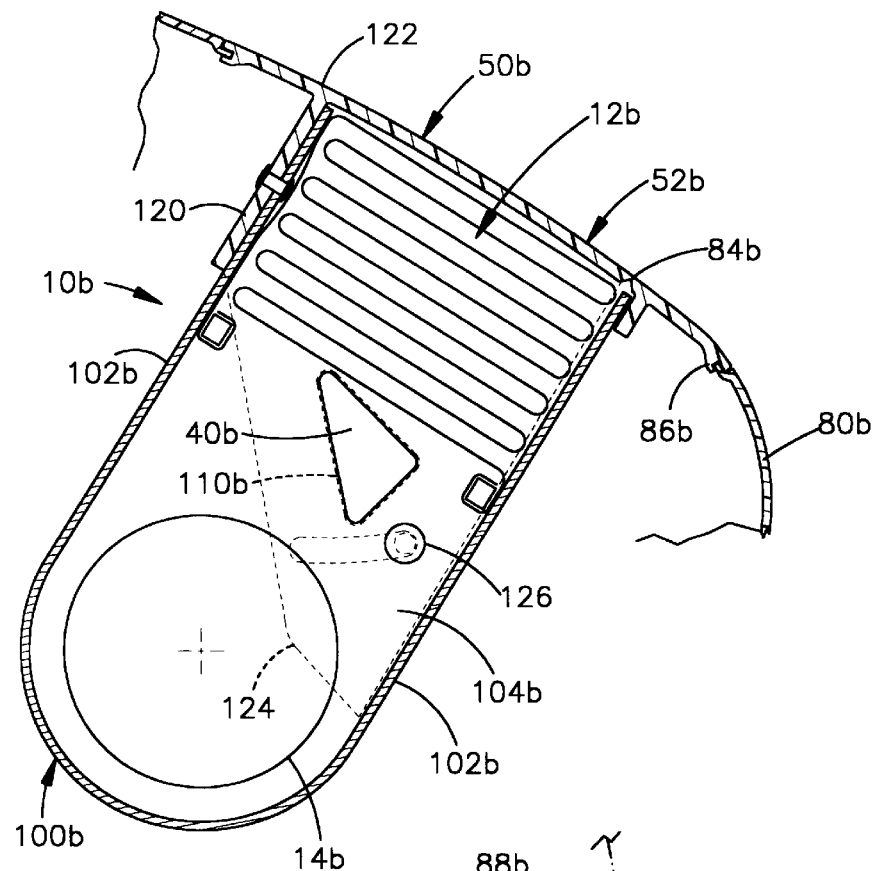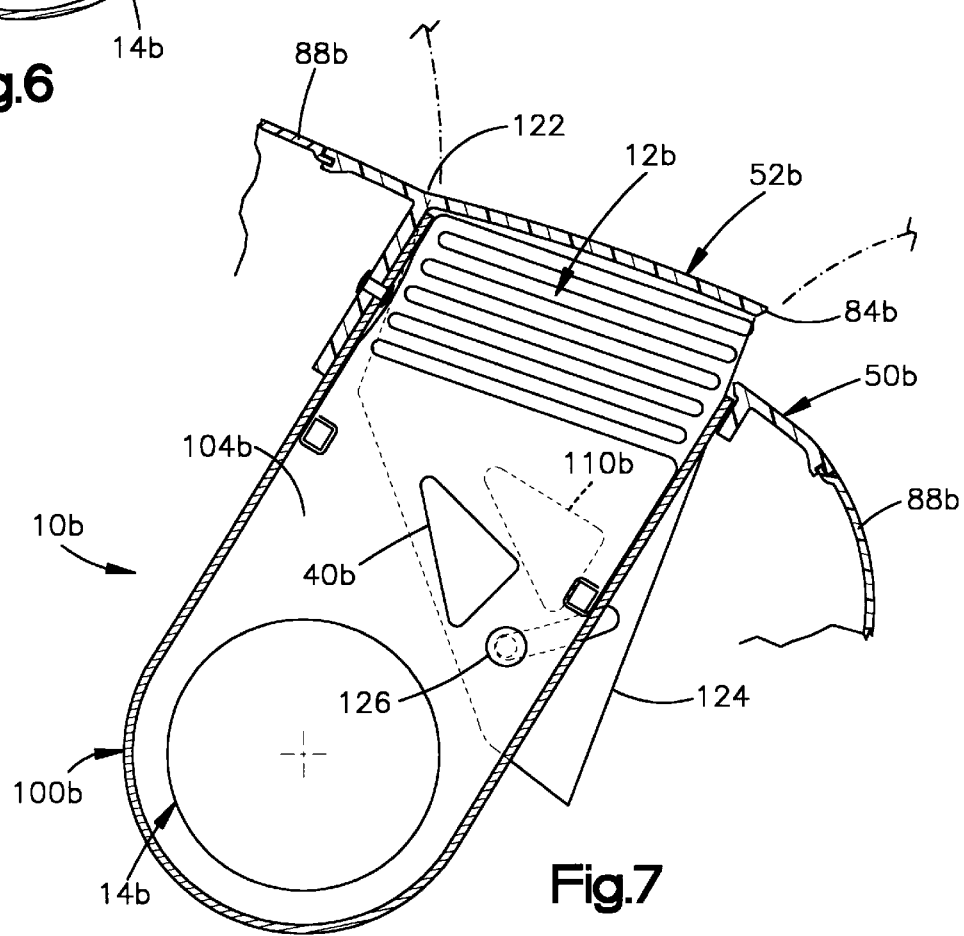

AIR BAG MODULE WITH FLUID VENTING

BACKGROUND OF THE INVENTION

1. Technical Field

The present invention relates to a vehicle safety apparatus and, in particular, relates to an air bag module with a fluid venting capability.

2. Description of the Prior Art

It is known to inflate an air bag slowly at first, then more rapidly, to provide a "soft start" inflation of the air bag. This effect can be achieved by selectively venting a portion of the inflation fluid which would otherwise flow into the air bag, thereby reducing the rate of inflation of the air bag. The "soft start" can help to minimize potential injury to an out of position vehicle occupant, that is, an occupant who is closer than desired to the module at the time of actuation.

SUMMARY OF THE INVENTION

The present invention is a vehicle safety apparatus comprising a vehicle occupant protection device inflatable from a deflated condition to an inflated condition to help protect an occupant of a vehicle. The safety apparatus also includes an actuatable inflation fluid source for providing inflation fluid into the interior of the protection device to inflate the protection device. The apparatus includes at least one vent opening in fluid communication with the interior of the protection device for venting inflation fluid from the protection device. A deployment door covers the protection device and is movable from a closed condition to an open condition to enable inflation of the protection device. A member movable with the deployment door has a first position enabling venting of inflation fluid through the vent opening and a second position closing the vent opening at least partially. The member is in the first position when the deployment door is in the closed condition to enable venting of inflation fluid out of the chamber through the vent opening. The member moves from the first position to the second position thereby closing the vent opening at least partially in response to movement of the deployment door from the closed condition toward the open condition.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is a view partially in section of an air bag module constructed in accordance with a second embodiment of the present invention and shown in a first condition of actuation;

FIG. 5 is a view similar to FIG. 4 showing the module of FIG. 4 in a second condition of actuation;

FIG. 6 is a view partially in section of an air bag module constructed in accordance with a third embodiment of the present invention and shown in a first condition of actuation;

FIG. 7 is a view similar to FIG. 6 showing the module of FIG. 6 in a second condition of actuation;

DESCRIPTION OF PREFERRED EMBODIMENTS

Figure 1:
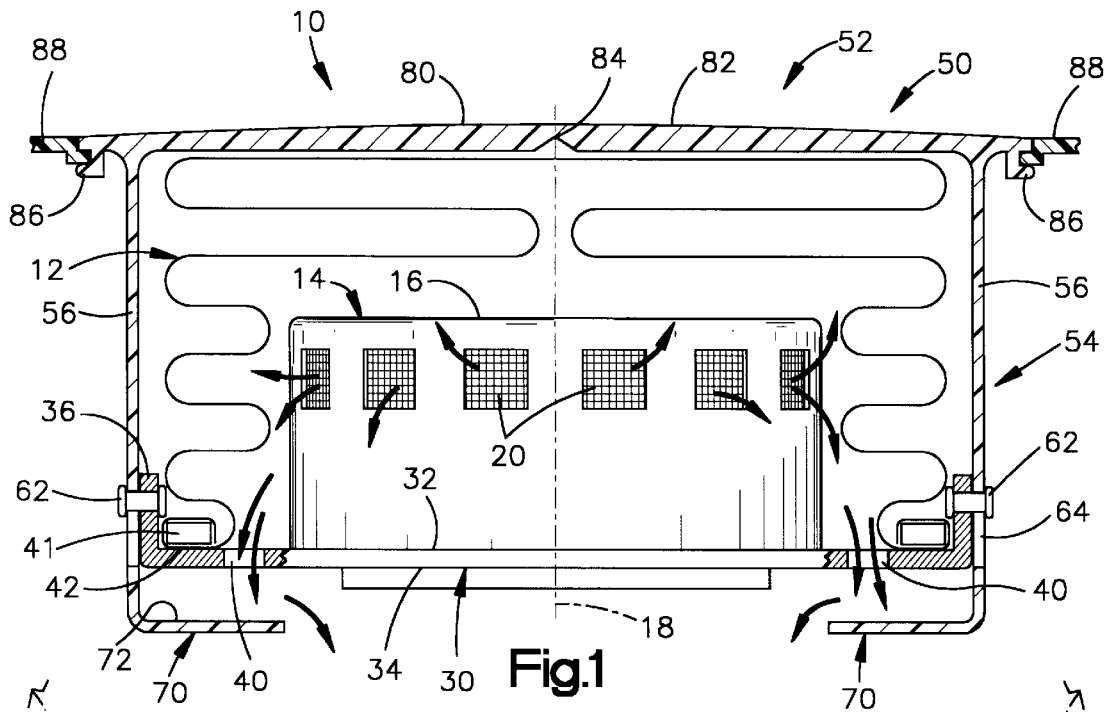
FIG. 1 is a view partially in section of an air bag module constructed in accordance with a first embodiment of the present invention and shown in a first condition of actuation.

The present invention relates to an air bag module. As representative of the present invention, FIG. 1 illustrates an air bag module 10. The air bag module 10 is mounted on an instrument panel (not shown) of a vehicle, in a known manner. It should be understood that an air bag module constructed in accordance with the present invention can be mounted on another part of a vehicle, such as a vehicle steering wheel, a door, or a seat.

The module 10 includes an air bag illustrated schematically at 12. Other inflatable vehicle occupant protection devices that can be used in accordance with the invention include, for example, inflatable seat belts, inflatable knee bolsters, inflatable head liners or side curtains, and knee bolsters operated by inflatable air bags.

The module 10 also includes an inflator 14. The inflator 14 has a cylindrical main body portion 16 centered on an axis 18 of the module 10. The main body portion 16 of the inflator 14 has a plurality of fluid outlets 20 for directing inflation fluid into the air bag 12 upon actuation of the inflator. The inflator 14 may be a pyrotechnic inflator which uses the combustion of gas-generating material to generate inflation fluid in the form of gas to inflate the air bag 12. The module 10 alternatively could include an inflator which contains a stored quantity of pressurized inflation fluid, or a combination of pressurized inflation fluid and ignitable material for heating the inflation fluid.

The inflator 14 includes, or is fastened to, a circular base plate 30. The base plate 30 projects radially outward from one axial end of the main body portion 16 of the inflator 14. The base plate 30 has a planar configuration including parallel, radially extending inner and outer side surfaces 32 and 34. The base plate 30 has an annular, axially extending outer peripheral rim 36.

A plurality of vent openings 40 are formed in the radially extending portion of the base plate 30. The vent openings 40 are disposed in a circular array centered on the axis 18, at a location radially outward of the main body portion 16 of the inflator 14. The vent openings 40 extend between the inner and outer side surfaces 32 and 34 of the base plate 30.

The module 10 includes a retaining ring 41. An end portion 42 of the air bag 12 is wrapped around the retaining ring 41. The retaining ring 41 is secured to the inner side surface 32 of the base plate 30 in a manner not shown, such as by rivets. The air bag 12 is thereby secured to the base plate 30. The vent openings 40 are in fluid communication with the interior of the air bag 12.

The module 10 includes a door assembly 50 for enclosing the air bag 12 and the inflator 14. The door assembly 50 is a one-piece plastic molding which includes a deployment door portion 52 and a main body portion 54. The main body portion 54 includes a side portion 56 of the door assembly 50. The side portion 56 has a cylindrical configuration and extends from the deployment door portion 52 to a location radially outward of the rim 36 of the base plate 30.

A plurality of rivets 62 are fixed to the rim 36 of the base plate 30. The rivets 62 extend slidably through corresponding slots 64 in the side portion 56 of the door assembly 50. The door assembly 50 is thereby supported on the base plate 30 for axial sliding movement relative to the base plate and the inflator 14.

The main body portion 54 of the door assembly 50 also includes an annular flange 70 which projects radially inward from the side portion 56. The flange 70 extends parallel to the base plate 30 on the side of the base plate opposite the main body portion 16 of the inflator 14. The flange 70 has a radially extending surface 72 which is presented toward the outer side surface 34 of the base plate 30. The flange 70 extends inward from the side portion 56 of the door assembly 50 so that the flange overlaps the vent openings 40 in the base plate 30.

The deployment door portion 52 of the door assembly 50 includes first and second relatively movable door panels 80 and 82. The door panels 80 and 82 are releasably joined by a predetermined weakened portion or tear seam 84 of the door assembly 50. The air bag 12 when in the deflated condition is packed tightly inside the door assembly 50, in engagement with the door panels 80 and 82. The deployment door portion 52, including the door panels 80 and 82, is made from a plastic material which is strong enough to protect the parts of the air bag module 10 which are enclosed within the door assembly.

The door assembly 50 includes locking tabs 86 which engage a portion 88 of the vehicle instrument panel facing into the vehicle occupant compartment. The locking tabs 86 are located radially outward of the deployment door portion 52 of the door assembly 50. The engagement of the locking tabs 86 with the instrument panel portion 88 blocks axial sliding movement of the door assembly 50 relative to the inflator 14, prior to actuation of the inflator 14.

The vehicle in which the module 10 is mounted includes known electrical means (not shown) for sensing a collision involving the vehicle and for actuating the inflator 14 in response to the sensing of a collision. The means may include a deceleration sensor and vehicle electric circuitry for actuating the inflator 14 in response to sensing a vehicle deceleration indicative of a vehicle collision having a severity greater than a predetermined threshold value.

In the event of an impact to the vehicle of a magnitude greater than the predetermined threshold value, the sensing means provides an electrical signal over lead wires to the inflator 14. The inflator 14 is actuated in a known manner. Inflation fluid flows out of the inflator 14 through the fluid outlets 20 and into the air bag 12. The rapidly flowing inflation fluid causes the air bag 12 to inflate in an upward direction as viewed in FIGS. 1 and 2.

FIG. 1 illustrates the parts of the module 10 in a condition immediately subsequent to actuation of the inflator 14, that is, within one or two milliseconds after actuation of the inflator. Inflation fluid is just beginning to flow from the inflation fluid outlets 20 into the air bag 12. The deployment door 52 is closed; the tear seam 84 is unruptured.

In this condition of the module 10, the flange 70 on the door assembly 50 is spaced apart axially from the base plate 30. The vent openings 40 are, therefore, uncovered. As a result, some of the inflation fluid which flows into the interior of the air bag 12 is able to flow out of the air bag through the vent openings 40. The vent openings 40 release only enough inflation fluid to slow the rate of inflation of the air bag 12, not enough to prevent inflation altogether. The air bag 12 therefore inflates fully, but at an initially slower rate, due to the presence of the vent openings 40.

As more inflation fluid flows into the air bag 12 from the inflator 14, the air bag inflates and pushes outward (upward as viewed in FIGS. 1 and 2) against the deployment door 52. The force of the inflating air bag 12 causes the door panels 80 and 82 to bulge outward. The force of the inflating air bag 12 also causes the locking tabs 86 on the door assembly 50 to break free from the instrument panel 88. The door assembly 50 is therefore free to move axially outward relative to the base plate 30.

Figure 2:
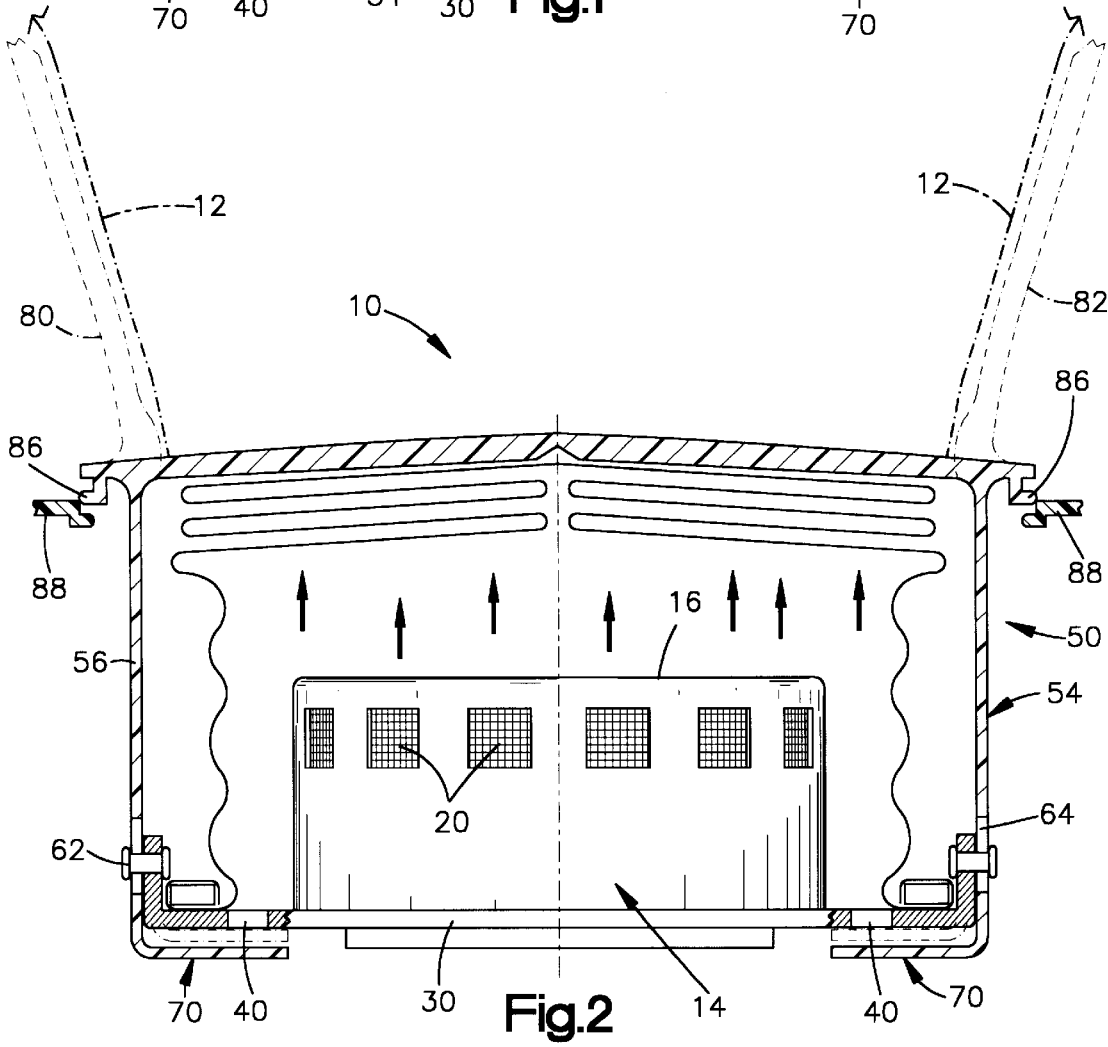
FIG. 2 is a view similar to FIG. 1 showing the module of FIG. 1 in a second condition of actuation.

As yet more inflation fluid flows into the air bag 12 from the inflator 14, the door assembly 50 as a whole moves outward relative to the base plate 30, toward and through the position shown in FIG. 2. The flange 70 on the door assembly 50 moves toward the base plate 30. The movement of the flange 70 closer to the base plate 30 gradually restricts flow of inflation fluid out of the air bag 12 through the vent openings 40. As the vent openings 40 thus close, a greater portion of the inflation fluid remains in the air bag 12 rather than flowing out through the vent openings. The air bag 12 inflates more rapidly, moving the door assembly 50 farther outward and thus closing the vent openings 40 more rapidly.

Eventually, the inner side surface 72 of the door assembly flange 70 engages the outer side surface 34 of the base plate 30. When this occurs, the vent openings 40 are substantially completely closed. The tear seam 84 ruptures, and the door assembly 50 opens to the condition shown in dot-dash lines in FIG. 2. The air bag 12 fills completely.

Figure 3:
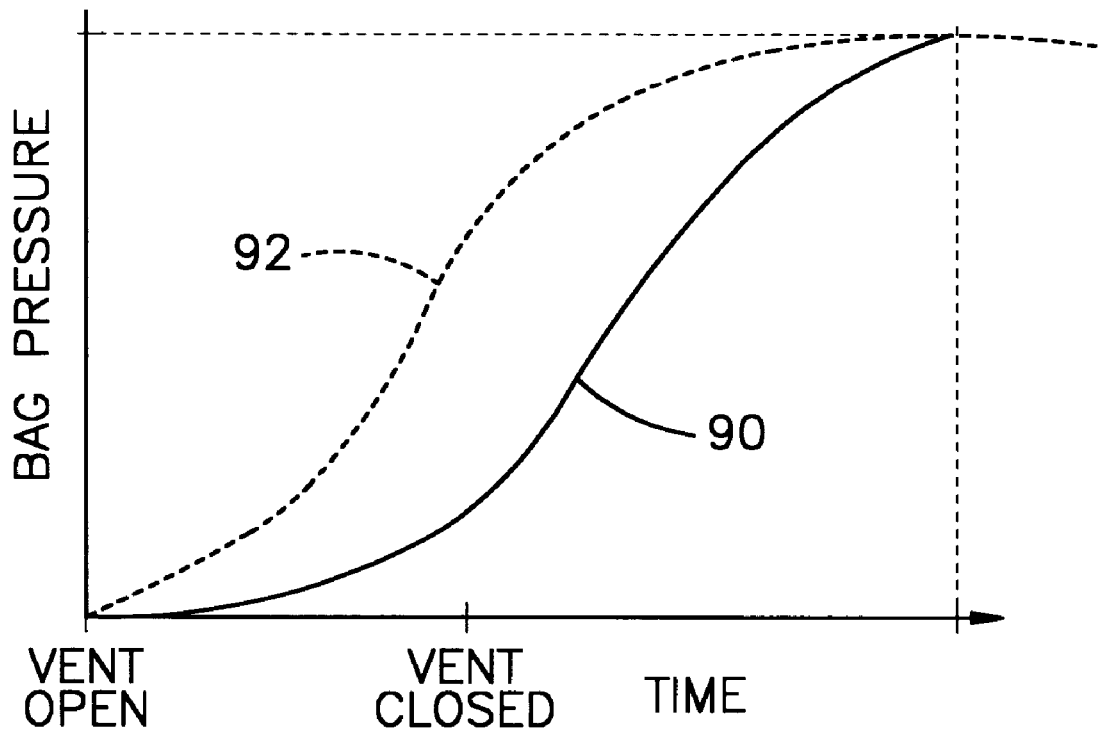
FIG. 3 is a graph illustrating pressure rise in an air bag module constructed in accordance with the present invention.

FIG. 3 is a graph representing the change in internal bag pressure as a function of time. The solid line 90 represents pressure in an air bag included in a module constructed with vent openings 40 in accordance with the present invention. The dashed line 92 represents pressure in an air bag included in a similar air bag module constructed without vent openings.

It can be seen from FIG. 3 that the internal bag pressure initially rises more slowly in the module 10 having the vent openings 40. This "soft start" inflation of the air bag can help to minimize potential injury to an out of position vehicle occupant, that is, an occupant who is closer than desired to the module 10 at the time of actuation. After the vent openings 40 close, the bag pressure rises rapidly until full inflation pressure is reached.

FIGS. 4 and 5 illustrate an air bag module 10*a* constructed in accordance with a second embodiment of the present invention. The module 10*a* is generally similar in construction to the module 10, and similar parts are given the same reference numerals with the suffix "a" added for clarity.

The module 10*a* includes a housing or reaction canister 100 in which the inflator 14*a* is fixed. The reaction canister 100 has first and second side walls 102 and opposite end walls 104 (only one of which is shown). At least one vent opening 40*a* is formed in each of the first and second side walls 102 and in the end wall 104 of the reaction canister 100.

The door assembly 50*a* of the module 10*a* has a side portion which includes side walls 56*a* slidable along the side walls 102 of the reaction canister 100. The door assembly 50*a* also has opposite end walls (not shown) which overlie and are slidable along the end walls 104 of the reaction canister 100. Each one of the end walls of the door assembly 50*a* has a respective vent opening 110.

FIG. 4 illustrates the parts of the module 10*a* in a condition immediately subsequent to actuation of the inflator 14*a*, that is, within one or two milliseconds after actuation. Inflation fluid is just beginning to flow from the inflator 14*a* into the air bag 12*a*. The deployment door 52*a* is closed; the tear seam 84*a* is unruptured.

In this starting condition of the module 10*a*, the vent openings 110 in the door assembly 50*a* overlie the vent openings 40 in the reaction canister 100. As a result, the vent openings 40a in the reaction canister 100 are in an uncovered or open condition. Some of the inflation fluid which flows into the interior of the air bag 12a is able to flow out of the air bag through the vent openings 40a. The combined area of all the vent openings 40a is selected to cause the air bag 12a to inflate fully, but at a reduced rate, due to the presence of the vent openings.

As more inflation fluid flows into the air bag 12a from the inflator 14a, the air bag inflates and pushes outward against the deployment door 52a. The force of the inflating air bag 12a causes the door panels 80a and 82a to bulge outward. The force of the inflating air bag 12a also causes the locking tabs 86a on the door assembly 50a to break free from the instrument panel 88a. The door assembly 50a is therefore free to move axially relative to the reaction canister 100.

As yet more inflation fluid flows into the air bag 12a from the inflator 14a, the door assembly 50a as a whole moves outward relative to the reaction canister 100 to the position shown in FIG. 2. The vent openings 110 in the door assembly 50a move away from the vent openings 40a in the reaction canister 100. This movement gradually closes the vent openings 40a in the reaction canister 100. As the vent openings 40a in the reaction canister 100 close, a greater portion of the inflation fluid remains in the air bag 12a. The air bag 12a inflates more rapidly, moving the door assembly 50a farther outward and thus closing the vent openings 40a in the reaction canister 100 more rapidly. Eventually, the vent openings 40a in the reaction canister 100 are substantially completely closed, and the air bag 12a fills completely.

FIGS. 6 and 7 illustrate an air bag module 10b constructed in accordance with a second embodiment of the present invention. The module 10b is generally similar in construction to the modules 10 and 10a, and similar parts are given the same reference numerals with the suffix "b" added for clarity.

The module 10b includes a housing or reaction canister 100b in which an inflator 14b is fixed. The reaction canister 100b has first and second side walls 102b and opposite end walls 104b (only one of which is shown). At least one vent opening 40b is formed in the end wall 104b of the reaction canister 100b.

The door assembly 50b of the module 10b has a back portion 120 fixed to the reaction canister 100b. A deployment door 52b is formed as one piece with the back portion 120. The deployment door 120 is hinged to the back portion 120 at a hinge point 122.

Two end walls 124 of the door assembly 50b (only one of which is shown) overlie the end walls 104b of the reaction canister 100b. The end walls 124 are fixed for movement with the deployment door 52b, relative to the back portion 120 of the door assembly 50b. Each one of the end walls 124b has a respective vent opening 110b. Pins 126 on the canister end walls 104b are received in slots in the door assembly end walls 124 to hold the door assembly end walls flat against the canister end walls.

FIG. 6 illustrates the parts of the module 10b in a condition prior to actuation of the inflator 14b. The deployment door 52b is closed. The tear seam 84b is unruptured. The vent opening 110b in the end wall 124 of the door assembly 50b overlies the vent opening 40b in the end wall 104b of the reaction canister 100b. As a result, the vent opening 40b in the reaction canister 100b is in an uncovered or open condition.

Upon actuation of the inflator 14b, some of the inflation fluid which flows into the interior of the air bag 12b is able to flow out of the air bag through the vent opening 40b in the reaction canister 100b. The area of the vent opening 40b is selected to vent only enough inflation fluid to cause the air bag 12b to inflate fully but at a reduced rate.

As more inflation fluid flows into the air bag 12b from the inflator 14b, the air bag inflates and pushes outward against the deployment door 52b. The force of the inflating air bag 12b causes the door assembly 50b to rupture at the tear seam 84b. The deployment door 52b pivots outward relative to the back portion 120 of the door assembly 50b. The end walls 124 of the door assembly 50b, which are fixed for movement with the door 52b, also pivot relative to the reaction canister 100b.

The vent openings 110b in the end walls 124 of the door assembly 50b move away from the vent openings 40b in the reaction canister 100b. This movement gradually closes the vent openings 40b in the reaction canister 100b. As the vent openings 40b in the reaction canister 110b close, a greater portion of the inflation fluid remains in the air bag 12b. The air bag 12b inflates more rapidly, moving the deployment door 52b farther outward and thus closing the vent openings 40b in the reaction canister 100b more rapidly. Eventually, the vent openings 40b in the reaction canister 100b are completely closed, and the air bag 12b fills completely.

Figure 8:
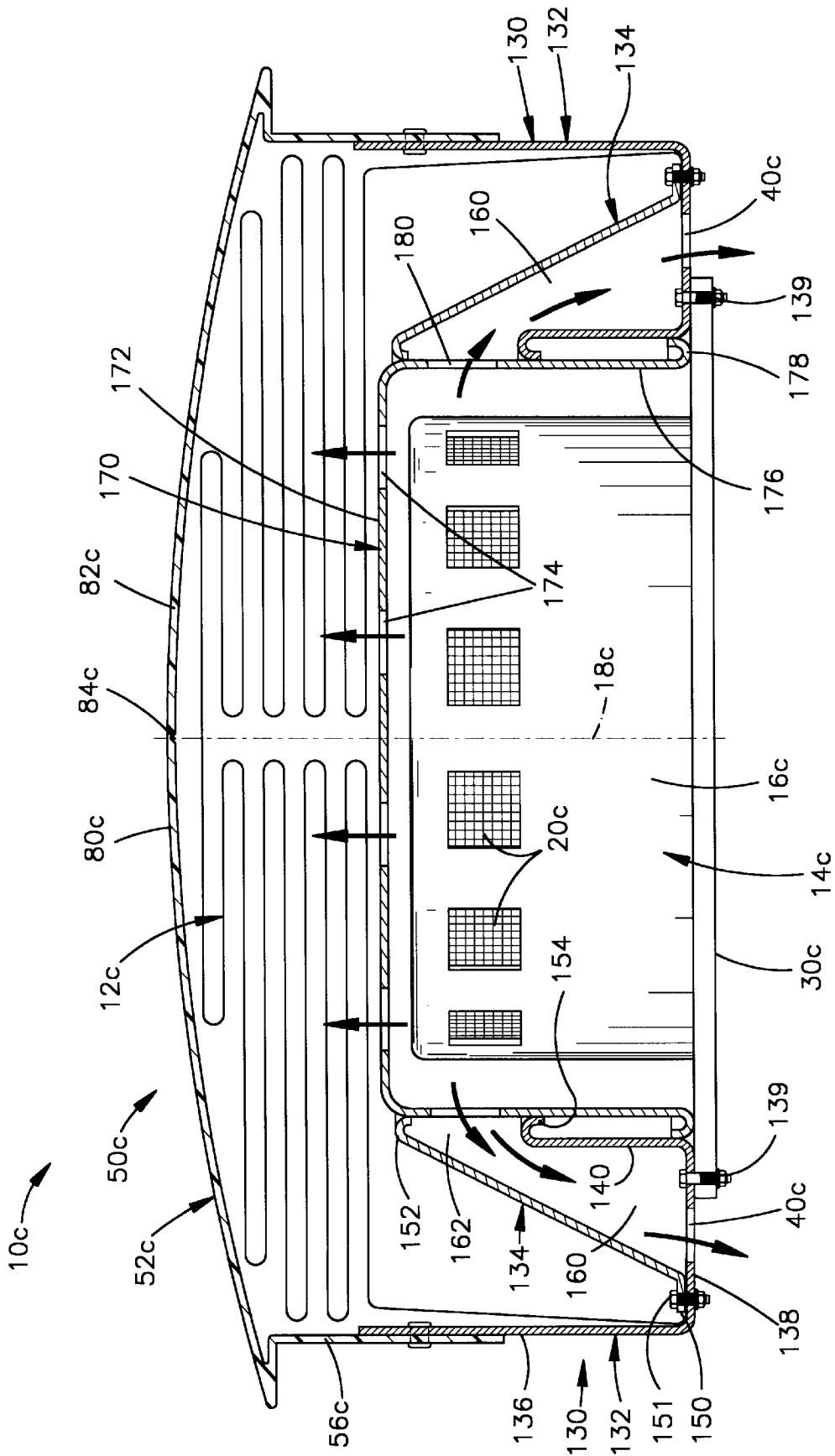
FIG. 8 is a view partially in section of an air bag module constructed in accordance with a fourth embodiment f the present invention and shown in a first condition of actuation.
Figure 9:
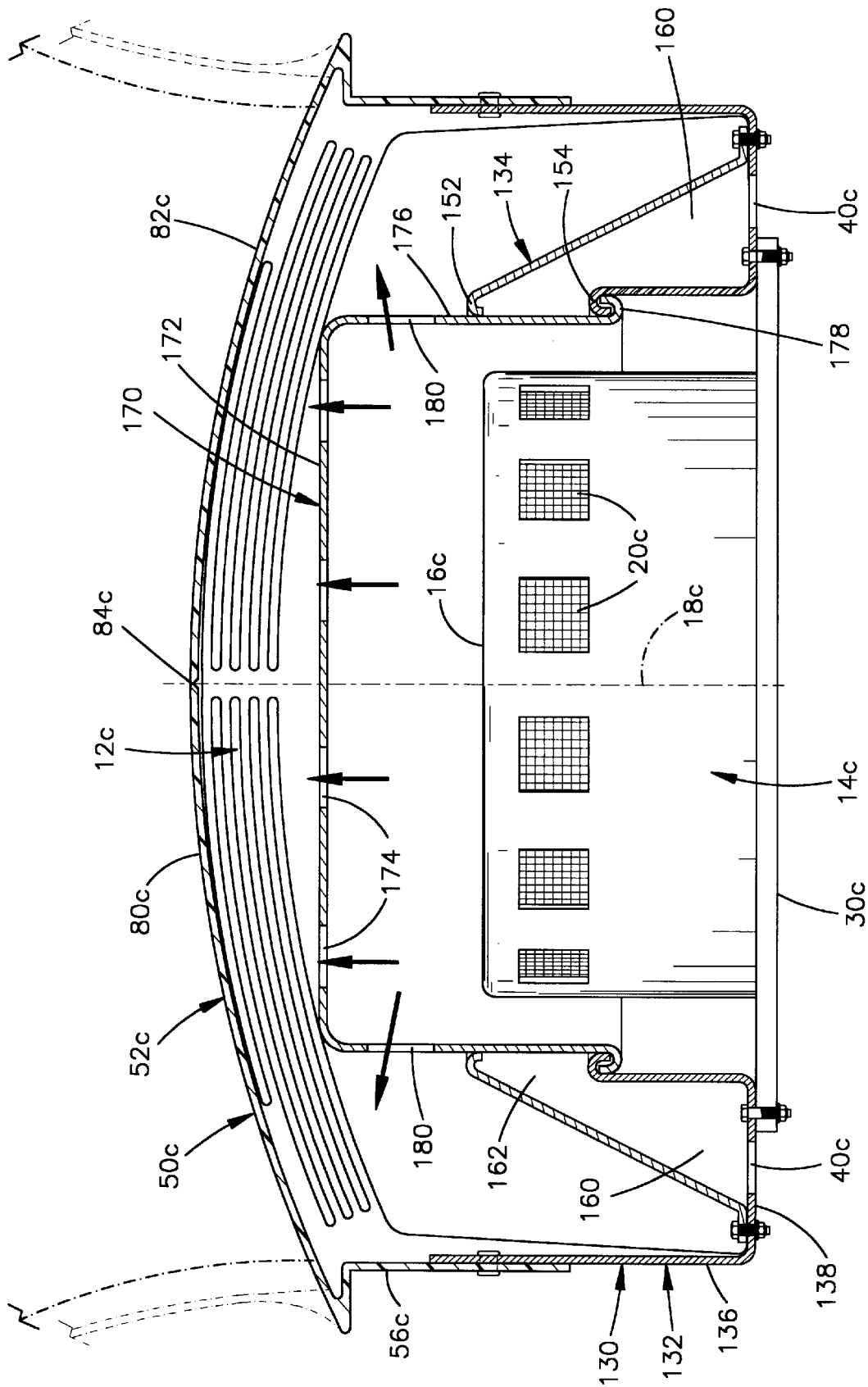
FIG. 9 is a view similar to FIG. 8 showing the module of FIG. 8 in a second condition of actuation.

FIGS. 8 and 9 illustrate an air bag module 10c constructed in accordance with a second embodiment of the present invention. The module 10c is similar in construction to the module 10, and similar parts are given the same reference numerals with the suffix "c" added for clarity.

The module 10c includes an inflator 14c similar in construction to the inflator 14. The inflator 14c includes, or is fastened to, a base plate 30c. The module 10c also includes a reaction canister or housing 130. The reaction canister 130 includes a main body portion 132 and a deflector 134, both of which are fixed in position relative to the inflator 14c.

The main body portion 132 of the reaction canister 130 has a cylindrical outer side wall 136 which extends parallel to the axis 18c. An annular end wall 138 of the reaction canister 130 extends radially inward from the outer side wall 136 in a direction toward the inflator 14c. The end wall 138 is secured to the base plate 30c by fasteners 139. An inner side wall 140 of the reaction canister 130 extends axially from the end wall 138 in a direction parallel to the outer side wall 136. The inner side wall 140 of the reaction canister 130 is spaced radially outward from the main body portion 16c of the inflator 14c.

A plurality of vent openings 40c are formed in the radially extending end wall 138 of the main body portion 132 of the reaction canister 130. The vent openings 40c are disposed in a circular array centered on the axis 18c, and are located radially between the side walls 136 and 140 of the reaction canister 130, at a location radially outward of the main body portion 16c of the inflator 14c.

The deflector 134 of the reaction canister 130 has a frustoconical configuration. The deflector 134 has an annular outer flange 150 fixed by fasteners 151 to the end wall 138 of the main body portion 132 of the reaction canister 130, at a location radially outward of the vent openings 40c. The deflector 134 tapers radially inward from the flange 150. An inner end portion 152 of the deflector 134 is aligned axially with an inner end portion 154 of the inner side wall 140 of the main body portion 132 of the reaction canister 130.

A fluid vent passage 160 is defined in the reaction canister 130 between the inner side wall 140 of the reaction canister 130 and the deflector 134. One end of the fluid vent passage is the annular space or opening 162 defined between the inner end portion 152 of the deflector 134 and the inner end portion 154 of the inner side wall 140 of the reaction canister 130. The fluid vent passage 160 terminates at its other end in the fluid vent openings 40c in the end wall 138 of the reaction canister 130.

The door assembly 50c of the module 10c includes a deployment door portion 52c and a main body portion 54c. The main body portion 54c includes a side portion 56c of the door assembly 50c. The side portion 56c has a cylindrical configuration and is disposed radially outward of the outer side wall 136 of the main body portion 132 of the reaction canister 130. A series of rivets 62c fix the side portion 56c of the door assembly 50c to the reaction canister 130.

The module 10c includes a movable member in the form of a cup 170. The cup 170 overlies or encloses the main body portion 16c of the inflator 14c. The cup 170 has a radially extending central wall 172 with a series of fluid outlets 174. A cylindrical side wall 176 of the cup 170 extends parallel to the axis 18c and terminates in a rolled rim 178. The side wall 176 of the cup 170 is disposed radially inward of, and is in sliding engagement with, both the inner end portion 152 of the deflector 134 and the inner end portion 154 of the inner side wall 140. A plurality of vent openings 180 are disposed in a circular array in the side wall 176 of the cup 170.

The module 10c includes an air bag illustrated schematically at 12c. The air bag 12c is secured by the fasteners 151 to the end wall 138 of the reaction canister 130, at a location radially outward of the vent openings 40c. As a result, the vent openings 40c are in fluid communication with the interior of the air bag 12c through the fluid vent passage 160 and the fluid outlet openings 174.

The vehicle in which the module 10c is mounted includes known electrical means (not shown) for sensing a collision involving the vehicle and for actuating the inflator 14c in response to the sensing of a collision. The means may include a deceleration sensor and vehicle electric circuitry for actuating the inflator 14c in response to sensing a vehicle deceleration indicative of a vehicle collision having a severity greater than a predetermined threshold value.

FIG. 8 illustrates the parts of the module 10c in a condition immediately subsequent to actuation of the inflator 14c, that is, within one or two milliseconds after actuation. The cup 170 is in a first or starting position relative to the reaction canister 130, in which the lower end portion 178 of the cup 170 rests on the base plate 30c of the inflator 14c. The vent openings 180 in the side wall 176 of the cup 170 are disposed adjacent to the inlet 162 of the fluid vent passage 160 in the reaction canister 130. As a result, the interior of the air bag 12c is in fluid communication with the fluid vent passage 160 in the reaction canister 130.

Upon actuation of the inflator 14c, inflation fluid flows from the inflation fluid outlets 20c into the interior of the cup 170. A first portion of the inflation fluid exits the cup 170 through the fluid outlets 174 in the central wall 172 of the cup 170. The first portion of the inflation fluid flows into the interior of the air bag 12c. This initial flow of inflation fluid into the air bag 12c causes the air bag to begin to inflate and push outward (upward as viewed in FIGS. 8 and 9) against the deployment door 52c. The force of the inflating air bag 12c causes the door panels 80c and 82c to bulge outward.

At the same time, a second portion of the inflation fluid exits the cup 170 through the fluid vent openings 180 in the side wall 176 of the cup. The second portion of the inflation fluid flows through the openings 180 into the fluid flow passage 160 in the reaction canister 130. This fluid is vented out of the reaction canister 130 through the vent openings 40c in the end wall 138 of the reaction canister 130.

As more inflation fluid flows out of the inflator 14c, the air bag 12c inflates more, pushing upward on the door panels 80c and 82c with greater force. The door panels 80c and 82c bulge outwardly, and the tear seam 84c eventually ruptures. The upward movement of the door panels 80c and 82c enables the air bag 12c to inflate and move away from the inflator 14. As a result, the cup 170 is able to move axially with the door panels 80c and 82c, in a direction away from the main body portion 16c of the inflator 14c, to the position shown in FIG. 9.

The axial movement of the cup 170 causes the fluid vent openings 180 in the side wall 176 of the cup to move out of alignment with the inlet 162 of the fluid flow passage 160 in the reaction canister 130. This movement gradually reduces the amount of inflation fluid flowing into the fluid vent passage 160, and correspondingly increases the amount of fluid flowing into the air bag 12c to inflate the air bag. The air bag 12c inflates more rapidly, moving the cup 170 farther outward and thus closing the inlet 162c more rapidly. Eventually, the inlet 162c is completely closed, and the air bag 12c fills completely.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle safety apparatus comprising:

a vehicle occupant protection device inflatable from a deflated condition to an inflated condition to help protect an occupant of a vehicle;

an actuatable inflation fluid source for providing inflation fluid into the interior of said protection device to inflate said protection device;

said apparatus including at least one vent opening in fluid communication with the interior of said protection device for venting inflation fluid from said protection device;

a deployment door covering said protection device and being movable from a closed condition to an open condition to enable inflation of said protection device; and a member movable with said deployment door, said member having a first position enabling venting of inflation fluid through said vent opening and a second position closing said vent opening at least partially;

said member being in the first position when said deployment door is in the closed condition to enable venting of inflation fluid out of said chamber through said vent opening;

said member moving from the first position to the second position thereby closing said vent opening at least partially in response to movement of said deployment door from the closed condition toward the open condition.

2. An apparatus as set forth in claim 1 wherein said deployment door and said member are formed as one piece from a plastic material.

3. An apparatus as set forth in claim 2 wherein said member comprises a flange extending generally parallel to said deployment door.

4. An apparatus as set forth in claim 1 wherein said member comprises a wall formed as one piece with said deployment door.

5. An apparatus as set forth in claim 4 wherein said wall slides relative to said vent opening to close said vent opening in response to movement of said deployment door from the closed condition toward the open condition.

6. An apparatus as set forth in claim 4 wherein said wall pivots relative to said vent opening to close said vent opening in response to movement of said deployment door from the closed condition toward the open condition.

7. An apparatus as set forth in claim 1 wherein said member is formed separately from said deployment door.

8. An apparatus as set forth in claim 1 wherein said member is a cup which encloses said inflation fluid source.

9. An apparatus as set forth in claim 1 wherein said cup has fluid openings separate from said vent openings, said fluid openings in said cup being movable to block flow of inflation fluid into said vent openings in response to movement of said deployment door from the closed condition toward the open condition.

10. An apparatus as set forth in claim 1 wherein said apparatus includes wall portions defining a fluid flow passage terminating in said fluid vent openings, said member having second fluid openings separate from said vent openings, said second fluid openings in said member being movable relative to said fluid vent openings to block flow of inflation fluid into said fluid flow passage in response to movement of said deployment door from the closed condition toward the open condition.

11. An apparatus as set forth in claim 1 wherein said apparatus includes a plate defining said at least one vent opening, said member moving relative to said plate, said deployment door and said member being formed as one piece from a plastic material.

12. An apparatus as set forth in claim 1 wherein said apparatus includes a plate member defining said at least one vent opening, and wherein said deployment door and said member are formed as one piece from a plastic material.

* * * * *